United States Patent [19]

Shaffer

[11] Patent Number: 5,068,310

[45] Date of Patent: Nov. 26, 1991

[54] POLYPHENYLENE ETHER PROCESS, CATALYST AND RESIN COMPOSITION

[75] Inventor: Timothy D. Shaffer, Voorheesville, N.Y.

[73] Assignee: General Electric Co., Selkirk, N.Y.

[21] Appl. No.: 571,943

[22] Filed: Aug. 23, 1990

[51] Int. Cl.$^5$ .............. C08L 67/06; C08L 71/12; C08G 65/38; B01J 31/00

[52] U.S. Cl. .................. 528/215; 528/212; 528/214; 528/216; 525/397; 502/165

[58] Field of Search .............. 528/215, 212, 214, 216; 525/397, 132; 502/165, 164

[56] References Cited

U.S. PATENT DOCUMENTS

| | | | |
|---|---|---|---|
| 3,306,874 | 2/1967 | Hay | 528/215 |
| 3,306,875 | 2/1987 | Hay | 528/215 |
| 3,365,422 | 1/1968 | Van Dort | 528/215 |
| 3,639,656 | 1/1972 | Bennett et al. | 528/215 |
| 3,642,699 | 1/1972 | Bennett et al | 528/215 |
| 3,661,848 | 5/1972 | Bennett et al. | 528/215 |
| 3,733,299 | 5/1973 | Cooper et al. | 528/215 |
| 3,838,102 | 9/1974 | Bennett et al. | 528/215 |
| 4,083,828 | 4/1978 | Olander | 528/215 |
| 4,092,294 | 5/1978 | Bennett et al. | 528/215 |
| 4,477,651 | 10/1984 | White et al. | 528/215 |
| 4,786,664 | 11/1988 | Yates | 525/439 |
| 4,806,602 | 2/1989 | White et al. | 525/397 |

Primary Examiner—John Kight, III
Assistant Examiner—Kathryne E. Shelborne
Attorney, Agent, or Firm—Francis T. Coppa; Joseph T. Eisele

[57] ABSTRACT

An improved process for producing a polyphenylene ether with low nitrogen content and low odor properties employs, for oxidative coupling of a 2,6-disubstituted phenol, a novel catalyst comprising a copper compound, a diamine, a tertiary amine, a quaternary compound and an unsaturated compound. The new polyphenylene ether is suitable for polymer blending, with, for example, styrenic resins, to make low odor blends.

20 Claims, No Drawings

POLYPHENYLENE ETHER PROCESS, CATALYST AND RESIN COMPOSITION

BACKGROUND OF THE INVENTION

1. Field of the Invention

The invention is directed to a new process, and products made thereby, employing a novel catalyst for the production of polyphenylene ethers (polyphenylene oxides). The improved polyphenylene ethers made by this process have reduced odor.

2. Brief Description of the Prior Art

The polyphenylene ethers and processes for their preparation are known in the art and described in numerous publications, including Hay, U.S. Pat. Nos. 3,306,874 and 3,306,875. Other procedures are described in Van Dort, U.S. Pat. No. 3,365,422, Bennett and Cooper, U.S. Pat. Nos. 3,639,656, 3,642,699, 3,733,299, 3,838,102, 3,661,848 and 4,092,294, and Olander, U.S. Pat. No. 4,055,553. All of these patents are incorporated herein by reference.

The processes most generally used to produce the polyphenylene ethers involve the self-condensation of a monovalent phenol in the presence of an oxygen-containing gas and a catalyst.

Improved catalyst systems have been developed for the preparation of polyphenylene ethers by the oxidative coupling of 2,6-di-substituted phenolic compounds. Such systems are disclosed in the above-noted U.S. Pat. No. 4,092,294. This patent discloses a catalyst which comprises a copper compound; a diamine wherein the two amino nitrogens are separated by at least two and no more than three carbon atoms, and the carbon atom to which the amino nitrogen are attached is aliphatic; a tertiary amine and a bromine-containing compound selected from the group consisting of hydrogen bromide, alkali metal bromides, alkaline earth metal bromides, 4-bromophenols and mixtures thereof plus an amount of a primary or secondary monoamine, most frequently a secondary monoamine of the formula RNHR' wherein R and R' are lower alkyl.

According to the prior art, this primary or secondary amine has a major effect on the reaction rate, as shown in U.S. Pat. Nos. 4,092,294 and 4,477,651. Almost all of the primary or secondary amine becomes incorporated into the polyphenylene ether. Polymers made in this way typically have between 600 and 1000 ppm of nitrogen bound in the polymer. The incorporation of the amine is believed to be mainly as so-called Mannich end groups having the structure:

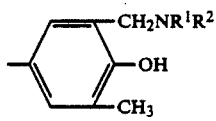

This incorporation has both advantages and disadvantages.

In regard to advantages, the amine groups in the polyphenylene ether can be lost thermally during processing or blending, resulting in the generation of reactive functional groups on the polymer, such as quinone methide structures that can couple with each other or with other materials (e.g. rubber, high impact polystyrene, etc.) to increase the molecular weight and to generate grafted products with such other materials. This beneficial effect aids compatibilization and may improve impact strength of blends. When this self-coupling is carried out by heating the polymer at the end of the polymerization, the process is known as "IV jump," in other words, the intrinsic viscosity reflecting the molecular weight "jumps" upward, on the order of a factor of 2. This is a desirable phenomenon, since the mechanical properties of the polymer generally improve with molecular weight.

On the other hand, in regard to disadvantages, the slow release of the secondary amine from the polymer even at ambient temperatures, presumably by a chemical elimination reaction, causes the polymer to emit an unpleasant odor.

The other amines used in the typical copper-based catalyst system for making polyphenylene ethers, i.e. typically a branched alkyl-substituted diamine, a tertiary amine and a quaternary ammonium compound, do not become a significant part of the polymer and do not contribute to odor appreciably, in contrast to the primary or secondary monoamine component.

Means have hitherto been sought for overcoming this amine-related odor problem. One approach taught by U.S. Pat. No. 4,806,602 is to end-cap the polymer by means of a further reaction with the polymer. However, running such reactions with a polymer is a costly and troublesome step, and it is difficult to achieve completeness of reaction.

Therefore, it is one object of my invention to overcome the odor problem by replacing the secondary amine if this could be accomplished without any significant loss in reaction rate or polymer properties. One polymer property that is important to retain is the molecular weight, as evidenced by the intrinsic viscosity. Another related property that would be desirable to maintain is the "IV jump" property, as described herein above. Therefore, further objects of my invention are to overcome the odor problem without losing molecular weight and preferably without losing the "IV jump" property.

The aforedescribed objectives are achieved in my improved process for making polyphenylene ethers by replacing the secondary dialkylamine component of the catalyst system by certain unsaturated compounds which are not amines, and which thus cannot generate amine structures in the polymer which are associated with undesirable odor. This total or substantially total replacement of the secondary monoamine by the unsaturated compound surprisingly leaves the catalyst system unchanged in effectiveness, and with the preferred unsaturated compounds, it also leaves the "IV jump" property of the polymer intact.

SUMMARY OF THE INVENTION

The present invention is directed to an improved process for forming a polyphenylene ether resin with low odor properties, which comprises the oxidative coupling of a 2,6-di-substituted phenolic compound in the presence of a catalytically effective proportion of a novel catalyst composition which comprises:

(a) a copper compound;
(b) a diamine wherein the two amine groups are separated by at least two and no more than three carbon atoms and the carbon atom to which the amino nitrogens are attached is aliphatic;
(c) a tertiary amine;
(d) a quaternary ammonium compound;

(e) an unsaturated compound selected from the group consisting of an olefin, an acetylene, an imine and a nitrile, having non-interfering substituents; and in the substantial absence of a monoamine other than said tertiary amine.

The present invention also encompasses the improved low-odor polyphenylene ethers made by my new process, and blends thereof with styrenic polymers.

DETAILED DESCRIPTION OF THE INVENTION

The following discussion presents the manner and process of making and using the catalyst system of the invention and the best method of carrying out the invention.

The process of the invention comprises an oxidative polymerization for the preparation of polyphenylene ethers which comprise a plurality of structural units having the formula:

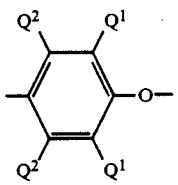

In each of said units independently, each $Q^1$ is independently halogen, primary or secondary lower alkyl (i.e. alkyl containing up to 7 carbon atoms), phenyl, haloalkyl, hydrocarbonoxy or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3pentyl. Preferably, any alkyl radicals are straight chain rather than branched. Most often, each $Q^1$ is alkyl or phenyl, especially $C_{1-4}$ alkyl, and each $Q^2$ is hydrogen. Further discussion of the structure of polyphenylene ethers is found, for instance, in U.S. Pat. No. 4,806,602 which is incorporated herein by reference.

The polymers thus formed by the process of the invention will hereinafter be called, for brevity, polyphenylene ethers, and it will be understood that such polyphenylene ethers have substituents as defined above. The phenols which are the starting material for the oxidative polymerization are those which have the same substituents $Q^1$ and $Q^2$. These phenols when described herein for brevity as 2,6-disubstituted phenols are meant to include those which have one or two additional substituents as hereinabove defined, in the 3 and-/or 5 position.

Representative of the phenol starting reactants in the process of the invention are those of the general, formula:

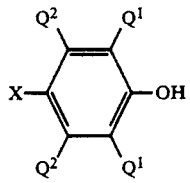

wherein $Q^1$ and $Q^2$ are as defined above and X represents hydrogen or halogen. Among halogen, bromine and chlorine are preferred.

The preferred polyphenylene ethers that are prepared by the process of the invention are those wherein both $Q^1$ radicals are hydrocarbon radicals having from 1 to 8 carbon atoms and $Q^2$ are each hydrogen or one $Q^2$ is hydrogen and the other is a hydrocarbon radical having from 1 to 8 carbon atoms. The especially preferred polyphenylene ethers are those where both $Q^1$ are methyl and at least one $Q^2$ is hydrogen and one or no $Q^2$ is methyl. The preferred polyethylene ethers include those which are made by polymerization of 2,6-dimethylphenol or combinations thereof with 2,3,6-trimethylphenol.

The particular copper compound used as component (a) of the catalyst system in the process of the invention is not critical. Representative copper compounds include cuprous chloride, cuprous bromide, cuprous sulfate, cuprous azide, cuprous tetramine sulfate, cuprous acetate, cuprous butyrate, cuprous toluate, cupric chloride, cupric bromide, cupric sulfate, cupric azide, cupric tetramine sulfate, cupric acetate, cupric toluate and the like. Preferred cuprous and cupric salts are the halides, cuprous bromide and cupric bromide being most preferred. These compounds may be prepared in-situ by the reaction of bromine or hydrogen bromide with, for instance, cuprous ether or cupric carbonate.

Diamines for use as component (b) of the catalyst system for the process of the invention include those diamines of the formula:

$$R^1HN\text{-}R^2\text{-}NHR^1$$

wherein each $R^1$ is independently isopropyl, a $C_{4-8}$ tertiary alkyl or a cycloalkyl group having no hydrogens on the alpha-carbon atom. $R^2$ has at least two and no more than three carbon atoms separating the two nitrogen atoms and is C2-4 alkylene or C3-7 cycloalkylene. Examples of these compounds include N,N'-di-t-butylethylenediamine, N,N'-di-t-amylethylenediamine and N,N'-di-isopropylethylenediamine.

The tertiary amine used as component (c) of the catalyst system for the process of the invention should be one having low steric requirements. Examples of these compounds are tri-lower-alkyl amines wherein the alkyl groups are of from 1 to 6 carbon atoms, such as trimethylamine or n-butyldimethylamine. In addition, cyclic amines such as N-methylpyrrolidine may be employed. A preferred species is n-butyldimethylamine.

Component (d) of the catalyst system for the process of the invention is a quaternary ammonium compound. Representative of these compounds are compounds of the formula $$[N(Ra^1)(Ra^2)(Ra^3)(Ra^4)]^+\ Xa^-$$

wherein $Ra^1$, $Ra^2$, $Ra^3$, and $Ra^4$ are alkyl, aralkyl or alkenyl groups of from 1-24 carbon atoms and Xa is an anion. The preferred anions are halides (such as bromide or chloride), sulfate or phosphate.

Mixtures of the ammonium salts may also be employed and preferably the total number of carbon atoms in the $Ra^1$, $Ra^2$, $Ra^3$, and $Ra^4$ substituents should be at least 10. The quaternary ammonium salts may be employed at a concentration in the range of from 100–2000 ppm based on the organic reaction solvent, and more preferably 500–1500 ppm, based on the organic reaction solvent.

The alkyl substituents may be methyl, ethyl, propyl, butyl, hexyl, octyl, decyl, cetyl, hexadecyl, and isomers thereof. Mixtures of these groups may also be employed. The aralkyl (i.e. alkyl substituted by aryl) substituent may include such radicals having from 7 to 20 carbon atoms such as benzyl, phenylethyl and the like. The alkenyl substituents include straight and branched chain unsaturated hydrocarbon radicals of from 1 to 24 carbon atoms which contain one or more double bonds.

The quaternary ammonium compounds are well known and many are commercially available. For example, reference may be made to Kirk-Othmer Encyclopedia of Chemical Technology, 2nd Edition, Vol. 16, pp. 859–865; Arquads, Armour Industrial Co. (1956) and Schwartz, A. M. et al., Surface Active Agents, Vol. I, pp. 156–171, Interscience Publishers (1949); and Vol. II, pp. 112–118 (1958). A particularly useful material available commercially under the name Adogen$^R$464 (Aldrich Chemical Co.) has the composition methyltrialkyl(C8-C10)ammonium chloride.

Advantageous to the process of the invention and of the catalyst system provided therefor is the use of the unsaturated compound as component (e), and the substantial absence of a monoamine other than the tertiary amine (c). Component (e) is an catalytically-effective amount (i.e. catalytically effective in combination with the other catalyst components) of an unsaturated compound selected from the group consisting of an olefin, an acetylene, an imine or a nitrile. The $C=C$, $C\equiv C$, $C=N$ or $C\equiv N$ group can be singly or multiply substituted by a non-interfering radical (to be defined hereinafter). Broadly, the invention is operative when the radical is hydrocarbyl (i.e. the radical from a hydrocarbon minus a hydrogen atom). In the case of the olefin ($C=C$ unsaturation) or an imine ($C=N$ unsaturation), a bifunctional hydrocarbyl(ene) radical can form a ring with the $C=C$ moiety. The hydrocarbyl can be further substituted by non-interfering radicals such as alkoxy, halogen, and hydroxy. Thus, representative unsaturated compounds for ingredient (e) encompass such olefins as ethylene, propylene, butylenes, 1-octene, 6-dodecene, cyclohexene, styrene, indene, stilbene, cyclooctadiene, and dicyclopentadiene. The invention is also operable using as ingredient (e) acetylenes such as methylacetylene, phenylacetylene, diphenylacetylene, dimethylacetylene, propargyl alcohol, butynol and butynediol. The invention is also operable using as ingredient (e) of the catalyst system such imines as 2-(methylimino)propane, oxazole, oxazoline, benzoxazole, or such nitriles as acetonitrile, valeronitrile, adiponitrile, and benzonitrile. The substituting radical on the unsaturated moiety can also be an electron-withdrawing group such as acyl, carbalkoxy, or the like. Preferred unsaturated compounds for use as ingredient (e) are those in which the unsaturated moiety is $C=C$ which is at least monosubstituted, the substituent being hydrocarbyl, acyl, ester, or hydrocarbyl substituted by a non-interfering radical, non-interfering radicals being exemplified by halogen or hydroxy. This preferred group affords high intrinsic viscosities (molecular weights).

Examples of unsaturated compounds in the preferred group are propene, 1-butene, 1-dodecene, styrene, methylstyrenes, methyl vinyl ketone, allyl chloride, allyl alcohol, methyl methacrylate, butyl crotonate, ethyl cinnamate, 1,4-dichloro-2-butene, t-2-butene-1,4-diol, and tetramethylethylene.

Exceptionally good results from the standpoint of intrinsic viscosity and also "intrinsic viscosity jump" are given by 1,2-dibenzoylethylene, 2-butene-1,4-diol and stilbene (1,2-diphenylethylene). The polyphenylene ethers resulting from use of these unsaturated compounds as ingredient (e) in the catalyst system are particularly outstanding in those mechanical properties which reflect high molecular weight, and their blends with the styrenic polymers, described in more detail hereinafter, have advantageous mechanical properties.

The unsaturated compound used as ingredient (e) in the catalyst system must have non-interfering substituents, such a substituent being one which binds sufficiently strongly to the copper or to the amine group so as to prevent the copper from sufficiently binding to the phenol substrate or so as to prevent the amine from sufficiently binding to the copper in the catalyst composition. Thus, substitution of the $C=C$ by acid groups such as —COOH, —SO$_3$H, -PO(OH)$_2$, CH$_2$OPO(OH)$_2$ and like acid groups so as to cause the amines to be protonated to ammonium is not permissable. Interfering substituents also include those which bind copper very tightly, such as sulfhydryl or vicinal dinitrile. One skilled in the art of homogeneous catalysis will readily recognize the interfering substituents.

In the practice of the process of the present invention, the amount of the unsaturated compound used per mole of monomer (i.e. 2,6-di-substituted phenolic compound) may range from about 0.001 mole per mole of monomer to about 0.01 mole per mole of monomer, with the most typical range being from about 0.0015 mole per mole of monomer to about 0.006 mole per mole of monomer.

The molar ratio of the tertiary amine to copper may be from about 10–100 moles/g. atom of copper and most typically from 20–50 moles/g. atom of copper. The molar ratio of 2,6-di-substituted phenol to copper is from 100 to 1200 and most typically 700 to 1000. The ratio of atoms of bromine per atom of copper is from 2 to 20, most typically 3 to 10. The diamine may be employed at a ratio of 1 to 5 moles of diamine per g. atom of copper, most typically 1.1 to 2.5 moles per g.atom.

An optional sixth component in the catalyst system of the invention is a bromine compound. Suitable bromine compounds for use as a component part of the catalyst system for the process of the invention include both bromophenols and inorganic bromides. Useful 4-bromophenols include 4-bromo-2,6-disubstituted phenols such as 4-bromoxylenol and the like. Useful bromides include alkali metal bromides and alkaline earth metal bromides such as sodium bromide, calcium bromide, and the like. Other bromides are listed in U.S. Pat. No. 3,733,299 which is hereby incorporated by reference.

Copper bromide-4-bromoxylenol solutions useful in the process of the invention may be prepared by adding bromine to a suspension of cupric carbonate or cuprous ether in methanol containing an excess of 2,6-xylenol. The bromine reacts with the xylenol to produce 4-bromoxylenol, the hydrogen bromide produced in the reaction converts the copper compound to copper bromide. The process of the invention makes available low odor polyphenylene ether resins which are suitable for blending with styrenic thermoplastic resins to make useful blended plastics of especially low odor. The new polyphenylene ethers of my invention are low in nitrogen, i.e. substantially below the 900 ppm level typical of the prior art resins made using dialkylamines as an ingredient of the catalyst system. Most typically my new polyphenylene oxides have less than 600 ppm nitrogen. This is the case even if the unsaturated compound used as ingredient (e) of the catalyst system is an imine or a nitrile. The odor improvement associated with this reduced nitrogen is of substantial commercial importance, and the products made by my new process thus are characterized both by low odor and by low nitrogen content.

The improved polyphenylene ethers of my invention are excellent resins for blending with styrenic resins, and the low odor feature carries over to such blends.

The styrenic resins with which the polyphenylene ether resins are blended to produce useful plastic blends are well known and will comprise at least 25% by weight of units derived from monomers of the formula:

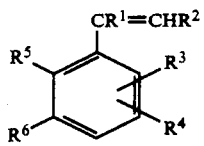

wherein $R^1$ and $R^2$ are selected from the group consisting of (lower) alkyl or alkenyl groups of from 1 to 6 carbon atoms and hydrogen; $R^3$ and $R^4$ are selected from the group consisting of hydrogen and (lower)alkyl and alkenyl groups of from 1 to 6 carbon atoms or $R^5$ and $R^6$ may be concatenated together with hydrocarbyl groups to form a naphthyl group. These compounds are free of any substituent that has a tertiary carbon atom. Styrene is the preferred monomer for preparation of the styrenic resins for use in the invention. Compositions of polyphenylene ethers and styrene resins are described by Cizek, U.S. Pat. No. 3,383,435 which is incorporated by reference.

The styrene resins may include units derived from an alpha,beta-unsaturated cyclic anhydride of the formula $R^7$—C(H)$_n$———C($R^8$)———(CH$_2$)$_m$—$R^9$ wherein the dotted lines represent a single or double carbon-to-carbon bond, $R^7$ and $R^8$ taken together represents a C(=O)—O—(=O) (anhydride) linkage, $R^9$ is selected from the group consisting of hydrogen, vinyl, alkyl, alkenyl, alkylcarboxylic or alkenylcarboxylic of from 1 to 12 carbon atoms, n is 1 or 2, depending on the position of the carbon-to-carbon double bond, and m is an integer of from 0 to about 10. Examples of such anhydrides include maleic anhydride, citraconic anhydride, itaconic anhydride, aconitic anhydride, and the like.

Rubber may be used in the preparation of the styrene resins to upgrade the physical properties of these resins according to well known techniques. The rubber employed may be a polybutadiene rubber, butyl rubber, styrene-butadiene rubber, acrylonitrile rubber, ethylene-propylene copolymers, natural rubber, EPDM rubbers, polysulfide rubbers, polyurethane rubbers, epichlorohydrin rubbers and the like.

The styrene resins may be homopolymers or they may comprise 40 to 1 parts by weight of the alpha,beta-unsaturated cyclic anhydride, from 60 to 99 parts by weight of a styrene compound and from 0 to 25 parts, preferably from 5 to 15 parts by weight of rubber. A preferred styrene resin is high-impact rubber-modified polystyrene. An example of a useful high-impact rubber modified polystyrene resin is Foster Grant 834, which contains about 8% of polybutadiene rubber.

The novel process of the invention reaction is preferably carried out with oxygen as the oxygencontaining gas, although air and mixtures of air with inert gases may be employed. It is advantageous to employ an inert aromatic solvent such as benzene or toluene as the reaction medium. Other solvents mentioned in the Hay patents may also be employed. The term "inert aromatic solvent" means an aromatic solvent which does not enter into or adversely affect the desired course of the reaction.

To carry out the process of the invention, typically, a suitable reaction vessel fitted with stirring means and heat removal means is charged with the solvent and the catalyst components. A stream of oxygen is introduced near the bottom of the reaction vessel and the monomer is added gradually over a period of about 30–40 minutes. Polymerization is carried out until a polymer is obtained which has an intrinsic viscosity of about 0.4–0.6 as measured in chloroform at 30°. The polymer may be recovered from the reaction mixture according to standard procedures. Typical reaction temperatures are about 10° to 60°, typical times from 10 minutes to 2 hours, typical pressures are at or near atmospheric, as disclosed in U.S. Pat. No. 4,092,294 already incorporated by reference.

The process of my invention and the preparation of the catalyst system therefor is illustrated by the following examples:

To 20 g. of a 50 wt. % solution of 2,6-xylenol in toluene, the following were added and dissolved: 0.34 g. dimethyl-n-butylamine, and 23.55 g. of a stock solution of 0.4243 g. of N,N'-di-t-butylethylenediamine, 0.22 g. Adogen 464 methyltrialkyl(C$_8$-C$_{10}$)ammonium chloride and 588.75 g. of toluene. The unsaturated compound was also added in an amount necessary to satisfy a 108:1 2,6-xylenol:unsaturated compound molar ratio. To this stirred mixture, 38.9 microliters of a 7.8 wt. % cuprous ether in 40% aqueous hydrogen bromide solution was added. Oxygen was bubbled through the solution only after obtaining liquid homogeneity. The oxidative polymerization was run at 30° C. for 2 hours. The polymer was isolated by precipitation from solution into methanol, and was collected by filtration and then dried under vacuum.

The polymers were evaluated by measurement of intrinsic viscosity both before and after heating to 300° C. for 15 minutes. The difference between the original and final intrinsic viscosity was reported as "IV jump". The odor on ambient temperature storage was also noted. The results, including number average molecular weight computed from intrinsic viscosity, are tabulated as follows:

| Unsat. compound | IV | IV jump | ppm N | M |
|---|---|---|---|---|
| t-1,2-Dibenzoyl-ethylene | 0.52 | 0.40 | 355 | 15,000 |
| t-2-Butenediol | 0.68 | 0.52 | 489 | 13,400 |
| t-Stilbene | 0.83 | 0.57 | 438 | 18,000 |
| 2-Butyne-1,4-diol | 0.42 | 0.07 | 367 | |
| Dicyclopentadiene | 0.58 | 0.04 | 421 | |
| 1-Octene | 0.60 | 0.03 | 565 | |
| Cyclopentene | 0.32 | 0.07 | 486 | |
| t-Cinnamic acid | <0.08 | — | — | |

-continued

| Unsat. compound | IV | IV jump | ppm N | M |
| --- | --- | --- | --- | --- |
| Benzoxazole | 0.55 | 0.00 | 313 | |
| Benzonitrile | 0.55 | 0.09 | 313 | |
| Fumaronitrile | 0.09 | — | — | |
| For comparison (prior art): | | | | |
| Di-n-butylamine | 0.46 | 0.30 | 900 | 19,000 |

All of the above prepared compositions had low odor upon storage at ambient temperature in a closed container for 24 hours, except for the comparison polyphenylene ether made using dibutylamine as a catalyst component in place of the unsaturated compound. Blends of these low odor compositions with high impact polystyrene also showed the low odor characteristic.

All of the U.S. patents indentified and described above are hereby incorporated herein by reference.

What is claimed is:

1. A process for producing a polyphenylene ether resin with low odor properties which comprises the oxidative coupling of a 2,6-di-substituted phenolic compound in the presence of a catalytically effective proportion of a catalyst composition which comprises:
   (a) a copper compound;
   (b) a diamine wherein the two amino groups are separated by at least two and no more than three carbon atoms and wherein the carbon atom to which the amino nitrogens are attached is aliphatic;
   (c) a tertiary amine;
   (d) a quaternary ammonium compound; and
   (e) an unsaturated compound selected from the group consisting of an olefin, an acetylene, an imine and a nitrile, having non-interfering substituents; and
   said process being carried out in the substantial absence of a monoamine other than said tertiary amine.

2. The process of claim 1 wherein said phenol is selected from 2,6-dimethylphenol and a mixture of 2,6-dimethylphenol and 2,3,6-trimethylphenol.

3. The process of claim 1 wherein said unsaturated compound (e) is an olefin substituted by at least one radical selected from the group consisting of hydrocarbyl and non-interfering electron-withdrawing substituents.

4. The process of claim 3 where the substituent groups are selected from hydrocarbyl, acyl, ester, or hydrocarbyl substituted by a non-interfering radical.

5. The process of claim 3 wherein the olefin is a hydrocarbyl-substituted ethylene.

6. The process of claim 3 wherein the olefin is stilbene.

7. The process of claim 3 wherein the olefin is 1,2-dibenzoylethylene.

8. The process of claim 3 wherein the olefin is 1-octene.

9. The process of claim 3 wherein the olefin is a dicyclopentadiene.

10. The process of claim 1 wherein the unsaturated compound is an acetylene.

11. The process of claim 10 wherein the acetylene is 2-butyne-1,4-diol.

12. The process of claim 1 wherein the unsaturated compound is a nitrile.

13. The process of claim 12 wherein the nitrile is benzonitrile.

14. The process of claim 1 wherein the unsaturated compound is an imine.

15. The process of claim 14 wherein said imine is benzoxazole.

16. A process for producing a polyphenylene ether resin with low odor properties which comprises the oxidative coupling of a 2,6-di-substituted phenolic compound in the presence of a catalytically effective proportion of a catalyst composition which comprises:
   (a) a copper compound, the molar ratio of said 2,6-disubstituted phenolic compound to the copper in said copper compound being from 100 to 1200;
   (b) a diamine wherein the two amino groups are separated by at least two and no more than three carbon atoms and wherein the carbon atom to which the amino nitrogens are attached is aliphatic, the molar ratio of said diamine to the copper in said copper compound being from 1 to 5;
   (c) a tertiary amine, the molar ratio of said tertiary amine to the copper in said copper compound being from 10 to 100;
   (d) a quaternary ammonium compound at a concentration of from 100–2000 ppm; and
   (e) an unsaturated compound selected from the group consisting of an olefin, an acetylene, an imine and a nitrile, having non-interfering substituents, the molar ratio of said unsaturated compound to said 2,6-disubstituted phenolic compound being from 0.001 to 0.15; and
   said process being carried out in the substantial absence of a monoamine other than said tertiary amine.

17. A process for producing a polyphenylene ether resin with low odor properties which comprises the oxidative coupling of a 2,6-di-substituted phenolic compound in the presence of a catalytically effective proportion of a catalyst composition which comprises:
   (a) a copper compound, the molar ratio of said 2,6-disubstituted phenolic compound to the copper in said copper compound being from 700 to 1000;
   (b) a diamine wherein the two amino groups are separated by at least two and no more than three carbon atoms and wherein the carbon atom to which the amino nitrogens are attached is aliphatic, the molar ratio of said diamine to the copper in said copper compound being from 1.1 to 2.5;
   (c) a tertiary amine, the molar ratio of said tertiary amine to the copper in said copper compound being from 20 to 50;
   (d) a quaternary ammonium compound at concentration of from 500–1500 ppm; and
   (e) an unsaturated compound selected from the group consisting of an olefin, an acetylene, an imine and a nitrile, having non-interfering substituents, the molar ratio of said unsaturated compound to said 2,6-disubstituted phenolic compound being from 0.001 to 0.15; and
   said process being carried out in the substantial absence of a monoamine other than said tertiary amine 18. A catalyst composition for the production of a low-odor polyphenylene ether, which comprises:
   (a) a copper compound;
   (b) a diamine wherein the two amino groups are separated by at least two and no more than three carbon atoms and wherein the carbon atom to which the amino nitrogens are attached is aliphatic;
   (c) a tertiary amine;

(d) a quaternary ammonium compound; and
(e) an unsaturated compound selected from the group consisting of an olefin, an acetylene, an imine and a nitrile, having non-interfering substituents.

19. A low-odor and low nitrogen polyphenylene ether as produced by the process of claim 1.

20. A low-odor blend of a polyphenylene ether of claim 19 with a styrenic resin.

* * * * *